(12) United States Patent
Yoshikawa et al.

(10) Patent No.: US 7,401,524 B2
(45) Date of Patent: Jul. 22, 2008

(54) CAPACITIVE PRESSURE SENSOR

(75) Inventors: Yasuhide Yoshikawa, Tokyo (JP);
Yoshiyuki Ishikura, Tokyo (JP); Toru Yamaguchi, Tokyo (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 11/597,110

(22) PCT Filed: May 12, 2005

(86) PCT No.: PCT/JP2005/008699

§ 371 (c)(1),
(2), (4) Date: Nov. 20, 2006

(87) PCT Pub. No.: WO2005/111566

PCT Pub. Date: Nov. 24, 2005

(65) Prior Publication Data

US 2007/0209443 A1 Sep. 13, 2007

(30) Foreign Application Priority Data

May 19, 2004 (JP) ............................. 2004-149137

(51) Int. Cl.
*G01L 9/12* (2006.01)
(52) U.S. Cl. ...................................... 73/718
(58) Field of Classification Search .................. 73/718, 73/724
See application file for complete search history.

(56) References Cited

U.S. PATENT DOCUMENTS 5,561,247 A 10/1996 Mutoh et al.
5,992,240 A * 11/1999 Tsuruoka et al. ............... 73/718
6,122,973 A * 9/2000 Nomura et al. ............... 73/724

FOREIGN PATENT DOCUMENTS

JP 2815279 8/1998

OTHER PUBLICATIONS

International Search Report for International Application No. PCT/JP2005/008699 dated Jun. 14, 2005.

* cited by examiner

*Primary Examiner*—Jewel V Thompson
(74) *Attorney, Agent, or Firm*—Cantor Colburn LLP

(57) ABSTRACT

In a capacitance type pressure sensor (1) including capacitance detecting portions formed in opposed regions in a capacitance chamber which is at least partially formed of a diaphragm, the capacitance detecting portions being a pressure-sensitive capacitance detecting portion (101) formed in a region of the diaphragm having large sensitivity with respect to a pressure and a reference capacitance detecting portion (102) formed in a region of the diaphragm having small sensitivity with respect to a pressure, there is provided the capacitance type pressure sensor which is entirely small in size and superior in reliability by independently detecting a signal output value of the reference capacitance detecting portion (102).

4 Claims, 7 Drawing Sheets

CAPACITIVE PRESSURE SENSOR

TECHNICAL FIELD

The present invention relates to a capacitance type pressure sensor, and more particularly to a capacitance type pressure sensor which is superior in measuring pressures in different pressure measurement regions.

BACKGROUND ART

For example, in a semiconductor chip manufacturing process, there has been widely used a pressure sensor configured to include a capacitance detecting portion in a capacitance chamber partially formed of a diaphragm (see, e.g., Japanese Patent Application Laid-open No. 2002-111011 as Patent Document 1).

Such a vacuum pressure sensor which measures a pressure in a semiconductor chip manufacturing process or in any other vacuum equipment is provided with a vacuum chamber and having individual two sensors, i.e., an atmospheric pressure sensor which confirms that an atmospheric pressure is achieved in a vacuum chamber when inputting or removing a silicon wafer as a material or a semiconductor chip as a product and a vacuum pressure sensor which measures a pressure of a process gas which flows into the vacuum chamber in a process, e.g., CVD (Chemical Vapor Deposition) is almost close to a vacuum.

It is to be noted that such a vacuum pressure sensor is generally provided with a pressure-sensitive capacitance detecting portion in a region of a sensor diaphragm where sensitivity with respect to a pressure is large and a reference capacitance detecting portion in a region where sensitivity with respect to a pressure is small, and the reference capacitance detecting portion is used to just compensate an output drift of the pressure-sensitive capacitance detecting portion involved by a change in temperature around the pressure sensor.

Patent Document 1: Japanese Patent Application Laid-open No. 2002-111011

DISCLOSURE OF INVENTION

Problem to be Solved by the Invention

In each conventional pressure sensor, a range of a pressure which can be measured is restricted. Therefore, in order to extensively detect a pressure, a plurality of pressure sensors must be provided so as to complement a measurement range of each pressure sensor. Further, when the plurality of pressure sensors are individually provided, there arises a problem that an installation space is taken for these sensors.

It is to be noted that the above-described problem is not a problem for measurement of a pressure close to a vacuum but a problem which can generally occur in an application having two different pressure measurement regions to exactly measure a pressure close to an atmospheric pressure in, e.g., a vulcanizer of a tire manufacturing apparatus and also measure a very high pressure in a machine during an operation of the vulcanizer.

It is an object of the present invention to provide a capacitance type pressure sensor which is small in an entire size and has different pressure measurement regions.

Means for Solving Problem

In order to solve the above-described problem, in a capacitance type pressure sensor comprising capacitance detecting portions formed in opposite regions in a capacitance chamber which is at least partially formed of a diaphragm, the capacitance detection portions being a pressure-sensitive capacitance detecting portion formed in a region of the diaphragm where sensitivity with respect to a pressure is large and a reference capacitance detecting portion formed in a region of the diaphragm where sensitivity with respect to a pressure is small, the capacitance type pressure sensor according to the present invention is characterized in that a signal output value of the reference capacitance detecting portion is independently detected.

When an output from the reference capacitance detecting portion is independently detected as a signal output value, this signal output value can be utilized for accurate pressure measurement in a limited narrow pressure measurement range of the pressure sensor or rough pressure measurement in a wide pressure measurement range of the same.

Furthermore, at least an embodiment of the present invention is characterized in that an external output value corresponding to a pressure is output based on a signal output value of the pressure-sensitive capacitance detecting portion and a signal output value of the reference capacitance detecting portion when the signal output value of the reference capacitance detecting portion falls within a fixed range, and that a predetermined external output value is output when the signal output value of the reference capacitance detecting portion exceeds the fixed range.

When the signal output value of the reference capacitance detecting portion is used for a judgment upon whether the pressure-sensitive capacitance detecting portion is out of a regular pressure measurement range, it is possible to cancel an erroneous signal generated by the pressure-sensitive capacitance detecting portion at the moment that a part of the region of the diaphragm where the pressure-sensitive capacitance detecting portion is formed reaches a bottom, thereby enabling accurate pressure measurement.

Moreover, at least an embodiment of the present invention is characterized in that an alarm is given when the signal output value of the reference capacitance detecting portion exceeds the fixed range.

When the alarm is used to inform that the pressure-sensitive capacitance detecting portion is out of the regular pressure measurement range based on the signal output value of the reference capacitance detecting portion, a measurement value in the regular pressure measurement range alone can be utilized as a correct measurement value.

Additionally, at least an embodiment of the present invention is characterized in that the signal output value of the reference capacitance detecting portion is output as an external output value.

When the signal output value of the reference capacitance detecting portion which is conventionally used for temperature compensation of the pressure-sensitive capacitance detecting portion is utilized as the external output value, it is possible to use one pressure sensor to measure not only a pressure in a narrow range requiring a pressure measurement accuracy but also a pressure in a wide range which does not require the pressure measurement accuracy, thereby reducing a size of the pressure sensor.

Further, at least an embodiment of the present invention is characterized in that an external output value corresponding to a pressure is obtained based on a signal output value of the pressure-sensitive capacitance detecting portion and a signal output value of the reference capacitance detecting portion when the signal output value of the reference capacitance detecting portion falls within a fixed range, and that the signal output value of the reference capacitance detecting portion is output as the external output value in place of outputting the predetermined external output value according to at least an embodiment of the present invention when an output from the reference capacitance detecting portion exceeds the fixed range.

Since the external output value of a narrow pressure requiring a measurement accuracy and the external output value in a wide pressure range not requiring the measurement accuracy are alternatively automatically switched, a user can uniquely utilize the external output value of the pressure sensor, and the user can be prevented from ambivalently selecting each different external output value which is output beyond the regular measurement range.

BEST MODE(S) FOR CARRYING OUT THE INVENTION

Figure 1:
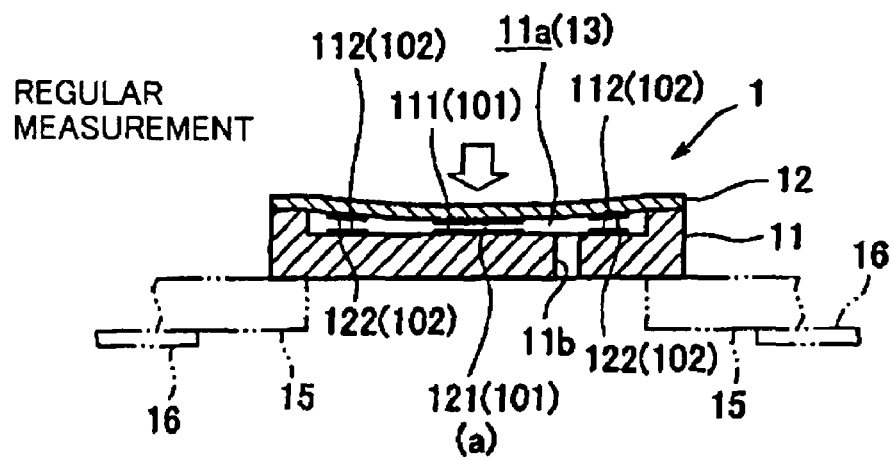
FIGS. 1 are cross-sectional views showing an outline structure of a capacitance type pressure sensor according to one embodiment of the present invention, which are a cross-sectional view showing a state in a regular measurement range (FIG. 1(a)), a cross-sectional view showing a state at the moment that a sensor diaphragm reaches a bottom (FIG. 1(b)) and a cross-sectional view showing a state after the sensor diaphragm is grounded (FIG. 1(c))
Figure 1:
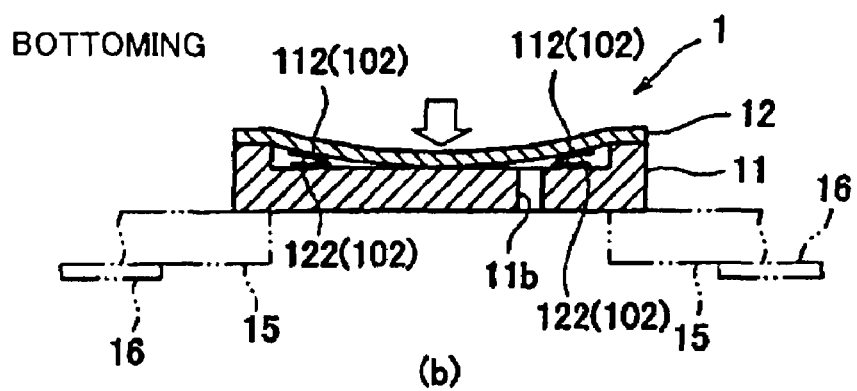
Figure 1:
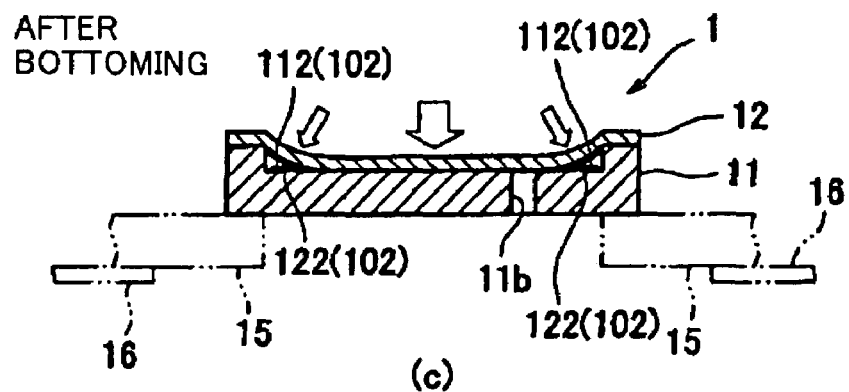

A capacitance type pressure sensor 1 (which will be referred to as a "pressure sensor 1" hereinafter) according to one embodiment of the present invention will now be described hereinafter. As shown in FIG. 1, the pressure sensor 1 according to the embodiment of the present invention is provided with a base portion 11 formed of sapphire which is a single-crystal body of aluminum oxide ($Al_2O_3$), a diaphragm 12 likewise formed of sapphire, and pressure-sensitive electrodes 111 and 121 and reference electrodes 112 and 122 which are respectively arranged to face each other in a capacitance chamber 13 formed of the base portion 11 and the diaphragm 12. Furthermore, the pressure sensor 1 is supported through a cover plate 15 consisting of sapphire and a metal plate 16 formed of a corrosion-resistant material for a metal which are indicated by a chain double-dashed line in the drawing.

Moreover, the base portion 11 and the diaphragm 12 are directly bonded to each other as described in Patent Document 1 (i.e. Japanese Patent Application Laid-open No. 2002-111011).

A conduction hole 1ib which maintains a vacuum in the capacitance chamber is formed in the base portion 11, and a pressure in the capacitance chamber is maintained as a vacuum through a gas absorption material which is a so-called getter (not shown) provided outside the base portion.

A concave portion 11a is formed in the base portion 11 by dry etching, and a pressure-sensitive capacitance detection electrode 111 which consists of gold (Au) or platinum (Pt) and has, e.g., a circular shape as seen in a plane is formed at a substantially central part of the concave portion 11a. Additionally, a reference capacitance detection electrode 112 which has, e.g., a ring-like shape as seen in a plane is formed apart from this electrode 111 so as to surround this electrode 111.

On the other hand, on a flat surface of the diaphragm 12 on a capacitance chamber side, a pressure-sensitive capacitance detection electrode 121 of the diaphragm 12 is formed at a position facing the pressure-sensitive capacitance detection electrode 111 of the base portion 11, and a reference capacitance detection electrode 122 of the diaphragm 12 is formed at a position facing the reference capacitance detection electrode 112 of the base portion 11.

Further, these electrodes 111, 112, 121 and 122 formed on the diaphragm 12 and the base portion 11 are respectively electrically led to the outside of the sensor through a non-illustrated lead wire and electrode pad.

Furthermore, the pressure sensor 1 is partitioned into a reference pressure region corresponding to the outside of the base portion and a vacuum in the capacitance chamber and a pressure application region corresponding to the outside of the diaphragm to which a pressure of a gas to be measured is applied through a pressure bulkhead consisting of the cover plate 15 and the metal plate 16 mentioned above. It is to be noted that, in a use range requiring a measurement accuracy of the pressure sensor 1, a region of the diaphragm 12 where the reference capacitance detecting portion 102 is formed does not reach the bottom.

As described above, the pressure-sensitive capacitance detecting portion 101 is formed in a region of the diaphragm 12 having large sensitivity with respect to a pressure, consists of a capacitor formed of two opposed circular electrodes, and has a pressure-sensitive capacitance (an electric capacitance) CX. Moreover, the reference capacitance detecting portion 102 is formed in a region of the diaphragm 12 having small sensitivity with respect to a pressure outside the above mentioned capacitor, consists of a capacitor formed of opposed ring-shaped electrodes, and has a reference capacitance (an electric capacitance) CY.

It is to be noted that the pressure sensor 1 is expanded or contracted due to an ambient temperature even though it is formed of any material such as sapphire, and hence an electric capacitance between the electrodes of the pressure sensor varies, but an error in an output owing to a change in a temperature in measurement of a small pressure requiring a measurement accuracy can be canceled by forming the two capacitors in one diaphragm and measuring a pressure by using both the pressure-sensitive capacitance detecting portion 101 and the reference capacitance detecting portion 102 while effecting special signal processing in this manner. It is to be noted that a specific canceling method of an output error will be described later.

The pressure sensor 1 having such a structure is installed while maintaining a small space in a vacuum chamber in a regular semiconductor chip manufacturing process, measures a pressure of a semiconductor process gas in a state where the vacuum chamber is closed, i.e., a pressure in a range which is substantially close to a vacuum, and measures whether the inside of the chamber has an atmospheric pressure suitable for handling when a process chamber is opened to put/remove a silicon wafer into/from this chamber.

It is to be noted that FIG. 1(a) shows a state where a small pressure which is, e.g., approximately 100 Pa is applied to the pressure sensor in a condition where the process chamber is closed. Additionally, FIG. 1(b) shows a state where the diaphragm reaches the bottom when a pressure which is, e.g., approximately 2,000 Pa is applied to the diaphragm of the pressure sensor 1. Further, FIG. 1(c) shows a state where a higher pressure is applied to the state depicted in FIG. 1(b).

When an excessive pressure is applied in this manner, the diaphragm 12 reaches the bottom of the opposed base portion 11, thereby increasing a breakdown withstand pressure.

Figure 2:
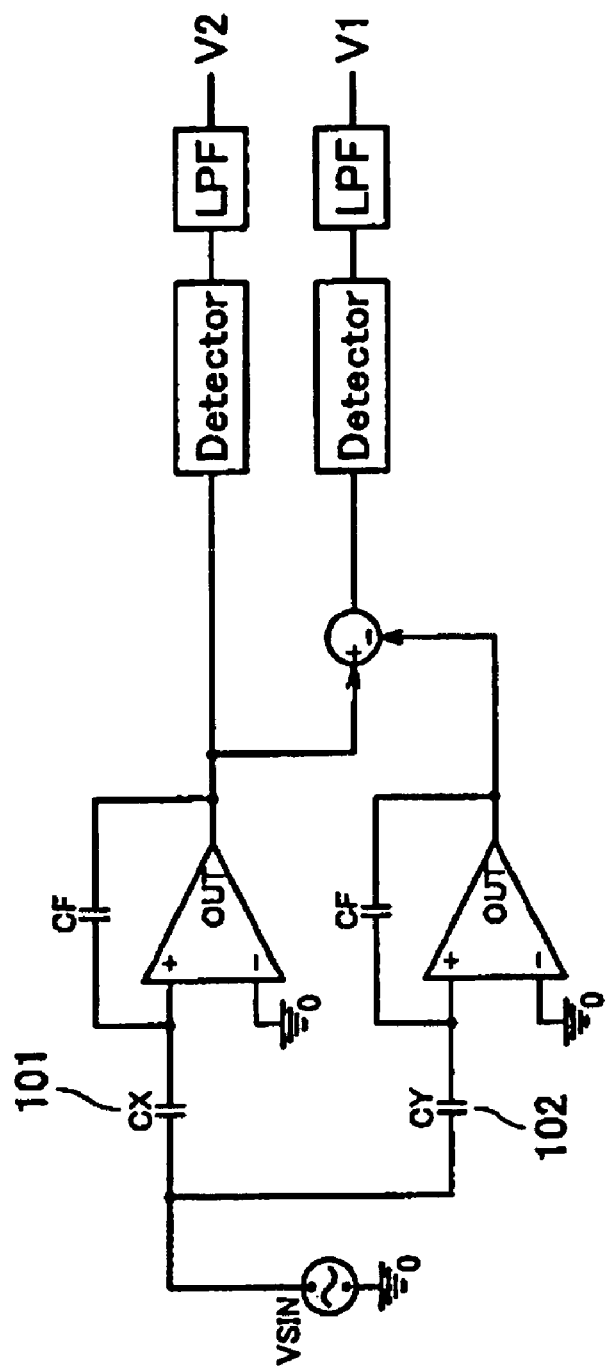
FIG. 2 is a view showing a detection circuit which performs temperature compensation at the time of pressure measurement by the capacitance type pressure sensor according to the embodiment of the present invention.

A description will now be given as to an example of a detection circuit which performs temperature compensation from the pressure-sensitive capacitance detecting portion 101 and the reference capacitance detecting portion 102 to obtain signal output values V1 and V2 required to measure a pressure. This detection circuit has such a structure as shown in FIG. 2. Here, VSin represents an input signal (an alternating current) to this circuit; CX, a capacitance of a capacitor formed of the pressure-sensitive capacitance detecting portion 101; and CY, a capacitance of a capacitor formed of the reference capacitance detecting portion 102. Further, CF represents a capacitance of a capacitor in the circuit; and Detector, a half-wave rectification or full-wave rectification circuit. Furthermore, LPF represents a low-pass filter which averages a rectified voltage.

Moreover, a predetermined alternating current is flowed to this detection circuit. This alternating current flows through the capacitor CF, which is provided with the circuit and the current is converted into a voltage, thereby obtaining a voltage having a sine wave. Additionally, this alternating voltage is subjected to full-wave rectification or half-wave rectification by the Detector to obtain a direct-current voltage, and this voltage is averaged by the LPF. Such signal processing obtains signal output values V1 and V2 based on the respective capacitances CX and CY. It is to be noted that the signal output value described herein means an output value which is internally used when measuring a pressure by the pressure sensor 1.

Incidentally, in case of the detection circuit shown in FIG. 2, signals which are in proportion to CX−CY and CX are respectively output to the signal output values V1 and V2 because of the circuit structure. The thus obtained V1 and V2 are turned to V1/V2 by the following arithmetic operation, and this value can be utilized as an accurate pressure measurement value (an external output value) in a small pressure. It is to be noted that the external output value described herein means an output value which is externally output in pressure measurement by the pressure sensor 1.

$$\frac{V1}{V2} = \frac{CX - CY}{CX} \qquad \text{[Numerical Expression 1]}$$

A description will now be given as to a reason why V1/V2 can be utilized as an accurate pressure measurement value (an external output value) in a small pressure.

The pressure sensor 1 according to this embodiment is a pressure sensor which detects a change between the electrodes due to a pressure as a change in a capacitance as described above. Further, the pressure-sensitive capacitance detecting portion 101 (the pressure-sensitive capacitance CX) which changes due to a pressure is arranged in a central region of the diaphragm as mentioned above. It is to be noted that the pressure-sensitive capacitance CX has error characteristics due to a thermal expansion coefficient of a material caused by a change in a dielectric constant between the electrodes or a change in a temperature. Therefore, the reference capacitance detecting portion 102 (the reference capacitance CY) which is not changed due to a pressure is arranged in a peripheral region of the diaphragm in order to correct an error as described above.

Here, assuming that an amount of a change in a gap between these electrodes which varies due to a pressure is Δd, each capacitance value is represented by the following expression.

$$CX = \varepsilon \cdot \frac{S}{d - \Delta d} \qquad \text{[Numerical Expression 2]}$$

$$CY = \varepsilon \cdot \frac{S}{d} \qquad \text{[Numerical Expression 3]}$$

ε: a dielectric constant d: an inter-electrode distance

S: an electrode area

Furthermore, when the following measurement is carried out, an influence of a dielectric constant or temperature characteristics can be canceled, and accurate measurement which is in proportion to a change in a pressure i.e. a change in an inter-electrode distance can be performed in a state where an influence of these factors is canceled.

$$\frac{CX - CY}{CX} = \frac{\varepsilon \cdot \frac{S}{d - \Delta d} - \varepsilon \cdot \frac{S}{d}}{\varepsilon \cdot \frac{S}{d - \Delta d}} = \frac{\Delta d}{d} \qquad \text{[Numerical Expression 4]}$$

That is, V1/V2 which is a ratio of the signal output values V1 and V2 obtained from the above-described circuit is equivalent to Δd/d and represents a degree of narrowness of a gap between the electrodes which varies due to a pressure, thereby detecting an accurate pressure in small pressure measurement.

Incidentally, even if a circuit configuration which measures (CX−CY)/(CX+CY) or (CX−CY)/CY or CX−CY or CX/CY is adopted in place of representing a small pressure value by (CX−CY)/CX alone, an influence of a dielectric constant or temperature characteristics can be canceled to accurately measure a small pressure.

A description will now be given as to a pressure detection algorithm of the pressure sensor according to the this embodiment which utilizes an external output value obtained in the above-mentioned circuit configuration with reference to FIGS. 3 to 6.

Figure 3:
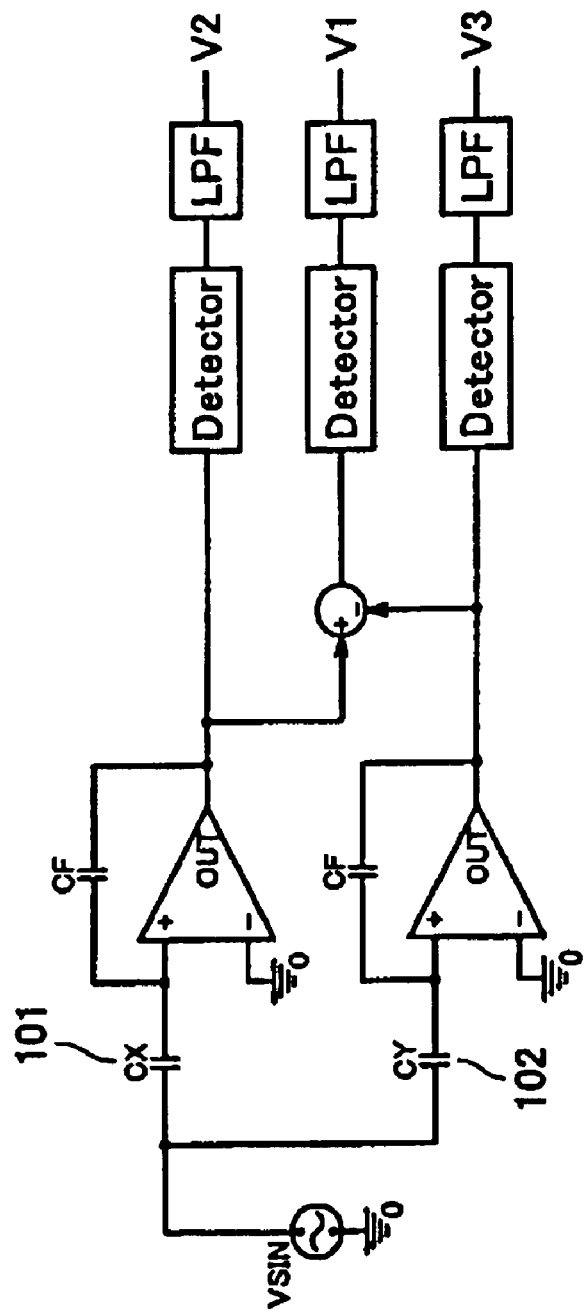
FIG. 3 is a view showing the detection circuit according to this embodiment.

It is to be noted that a signal output value of the reference capacitance detecting portion 102 must be obtained when carrying out this algorithm, and hence this embodiment uses a circuit configuration depicted in FIG. 3 in which a circuit which can acquire an output V3 is added to the circuit configuration illustrated in FIG. 2. This detection circuit can measure a signal output value which is in proportion to the reference capacitance CY alone as the signal output value V3 in its circuit configuration. How to use this signal output value V3 which is in proportion to CY alone will be described in the following algorithm.

First to fourth algorithms of the detection algorithm will now be sequentially described. As the first algorithm, measurement of a single signal output value of the reference capacitance CY is constantly performed simultaneously with measurement of (CX−CY)/CX by the above-described detection circuit. Moreover, when the signal output value of the reference capacitance CY exceeds a point A shown in FIG. 4 as will be described later, a signal output value of the pressure-sensitive capacitance CX is forcibly fixed to an upper limit value (a predetermined value) and used as an external output value irrespective of the fact that the signal output value of the pressure-sensitive capacitance CX is a regular measurement value, thereby eliminating an erroneous output. It is to be noted that a judgment upon this signal output value may be made in a program by using a microprocessor or the like or may be made by driving a switch with an output from a comparator in an analog manner.

Specific contents of the first algorithm (an abnormal output prevention algorithm involved by bottoming of the diaphragm at the pressure-sensitive capacitance detecting portion) are as follows.

First, a signal output value of the reference capacitance CY is measured as V3 of the circuit shown in FIG. 3, and a correction arithmetic operation is performed as required.

When this signal output value is not greater than A, (CX−CY)/CX=Δd/d is measured by the above-described detection circuit, and an output is made while effecting a correction arithmetic operation as required. That is, this Δd/d is output as a measurement value of a small pressure.

Additionally, when this signal output value is not smaller than A, an output of the pressure-sensitive capacitance CX is fixed to an upper limit value, and this upper limit value is output as an external output value.

Figure 4:
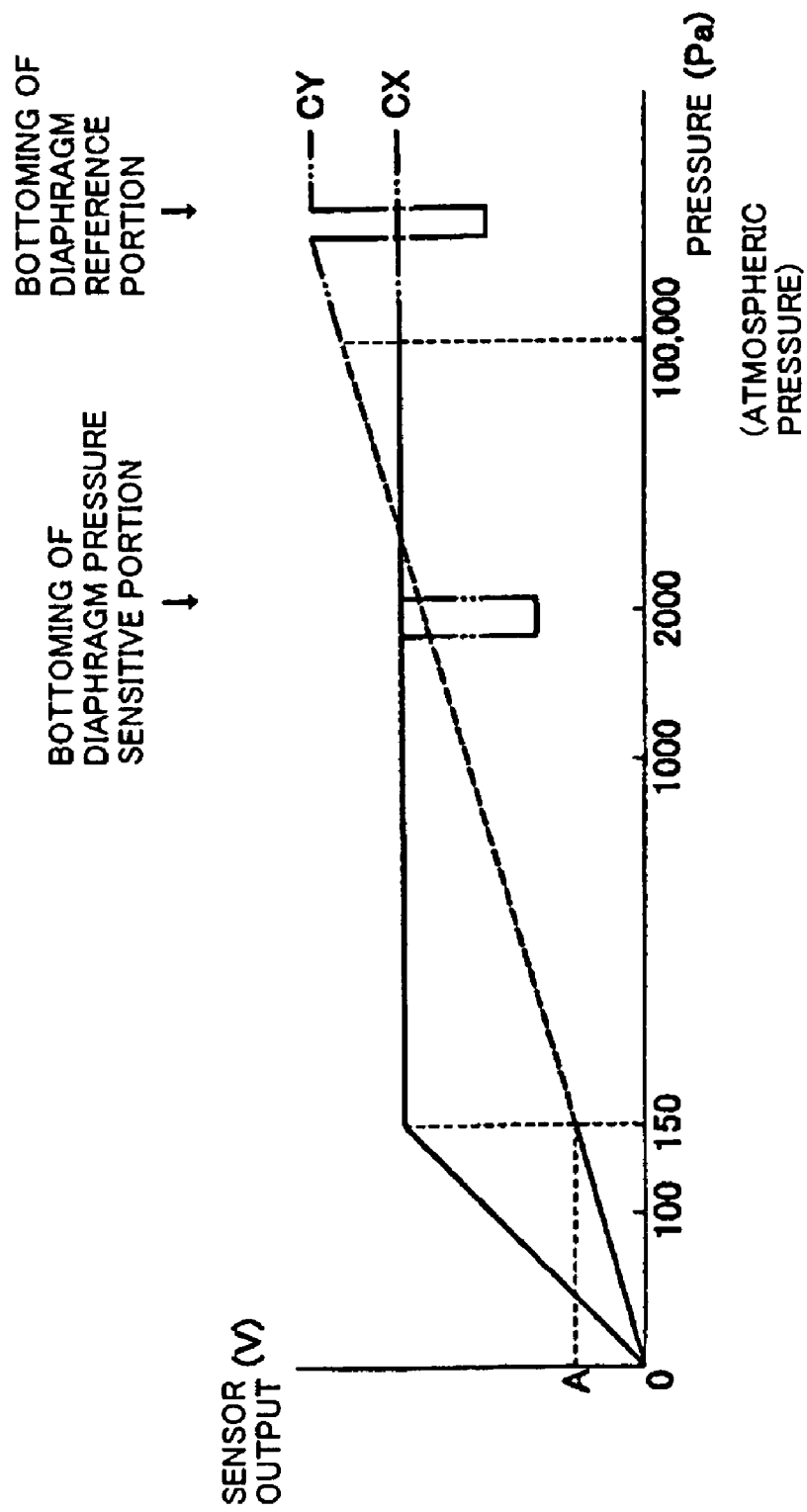
FIG. 4 is a view showing a relationship between a pressure applied to the sensor diaphragm and outputs from a pressure-sensitive capacitance detecting portion and a reference capacitance detecting portion in a first algorithm and a second algorithm according to this embodiment.

FIG. 4 is a view showing a sensor output obtained from the pressure-sensitive capacitance detecting portion 101 and a sensor output acquired from the reference capacitance detecting portion 102 in such a pressure sensor 1 in accordance with a magnitude of a pressure applied to the pressure sensor 1.

As indicated by a solid line in FIG. 4, although the signal output value of the pressure-sensitive capacitance detecting portion 101 increases in accordance with a pressure of a process gas acting on the pressure sensor 1 in a range where the pressure is 0 Pa to 150 Pa, the signal output value of the pressure-sensitive capacitance detecting portion 101 is output as the external output value while being fixed to the upper limit value in case of a higher pressure more than the pressure in the range (see the solid line in FIG. 4).

It is to be noted that a part of the region of the diaphragm 12 on which the pressure-sensitive capacitance detecting portion 121 is formed reaches the bottom with a pressure of approximately 2,000 Pa in this embodiment, but an inconvenience that an output is temporarily lowered in the vicinity of bottoming like an output from a conventional pressure-sensitive capacitance detecting portion (see a chain double-dashed like in FIG. 4) does not occur, and the external output value is kept being fixed to the upper limit value as indicated by the solid line, thereby avoiding generation of an erroneous external output value at the time of bottoming of the diaphragm.

When the signal output value of the reference capacitance detecting portion 102 is used for a judgment upon whether the pressure-sensitive capacitance detecting portion 101 is out of the regular pressure measurement range in this manner, it is possible to cancel an erroneous signal generated by the pressure-sensitive capacitance detecting portion 101 at the moment that a part of the region of the diaphragm 12 on which the pressure-sensitive capacitance detecting portion 101 is formed reaches the bottom, thus enabling accurate pressure measurement.

Additionally, as the second algorithm, an alarm signal may be output simultaneously with fixing the signal output value of the pressure-sensitive capacitance CX to the upper limit value as the external output value like the first algorithm. As a result, a user can instantaneously determine that the pressure-sensitive capacitance detecting portion 101 is out of the regular measurement range.

Specific contents of the second algorithm (an abnormal output prevention+alarm out algorithm involved by bottoming of the diaphragm at the pressure-sensitive capacitance detecting portion 101) are as follows.

First, a signal output value of the reference capacitance CY is measured, and a correction arithmetic operation is carried out as required. Here, if this signal output value is not greater than A, (CX−CY)/CX=Δd/d is measured by the above-mentioned detection circuit and this is output as an external output value while performing a correction arithmetic operation as required. That is, this Δd/d is utilized as a measurement value of a small pressure. Additionally, if this signal output value is not smaller than A, an upper limit value is output as an external output value of the pressure-sensitive capacitance CX, and an alarm signal is output.

This second algorithm has output characteristics shown in FIG. 4 like the first algorithm. That is, this algorithm is the same as the first algorithm in that signal processing is carried out with an influence of a temperature is canceled based on the signal output value obtained from the pressure capacitance detecting portion 101 and the signal output value acquired from the reference capacitance detecting portion 102 in the pressure sensor 1 and that measurement of an erroneous external output value is avoided when the pressure-sensitive capacitance detecting portion of the diaphragm 12 reaches the bottom. However, the second algorithm is different from the first algorithm in that the signal output value of the pressure-sensitive capacitance detecting portion 101 is fixed to the upper limit value as the external output value and an alarm is generated in case of a pressure which is more than the range of 0 Pa to 150 Pa.

When the fact that the pressure-sensitive capacitance detecting portion 101 is out of the regular pressure measurement range is informed based on the signal output value of the reference capacitance detecting portion 102 by using an alarm in this manner, the external output value which falls within the regular pressure measurement range alone can be utilized as a correct measurement value.

The third algorithm will now be described. As the third algorithm, when a signal output value of the reference capacitance CY is measured beyond the point A, a signal output value of the reference capacitance CY measured before the signal output value of the reference capacitance CY exceeds the point A is output as an external output value without change.

Specific contents of the third algorithm (the algorithm involved an abnormal prevention by bottoming of the diaphragm at the pressure-sensitive capacitance CX+reference capacitance CY output) are as follows.

First, a reference capacitance CY value is measured, and a correction arithmetic operation is carried out as required.

Further, if this signal output value is not greater than A, (CX−CY)/CX=Δd/d is measured by using the above-described detection circuit, and a correction arithmetic operation is performed as required to output an obtained result. Furthermore, this Δd/d is output as a measurement value of a small pressure.

Moreover, if the signal output value is not smaller than A, an upper limit value is output as an external output value of the pressure-sensitive capacitance detecting portion 101, and a signal output value of the reference capacitance detecting portion 102 is output as an external output value.

Figure 5:
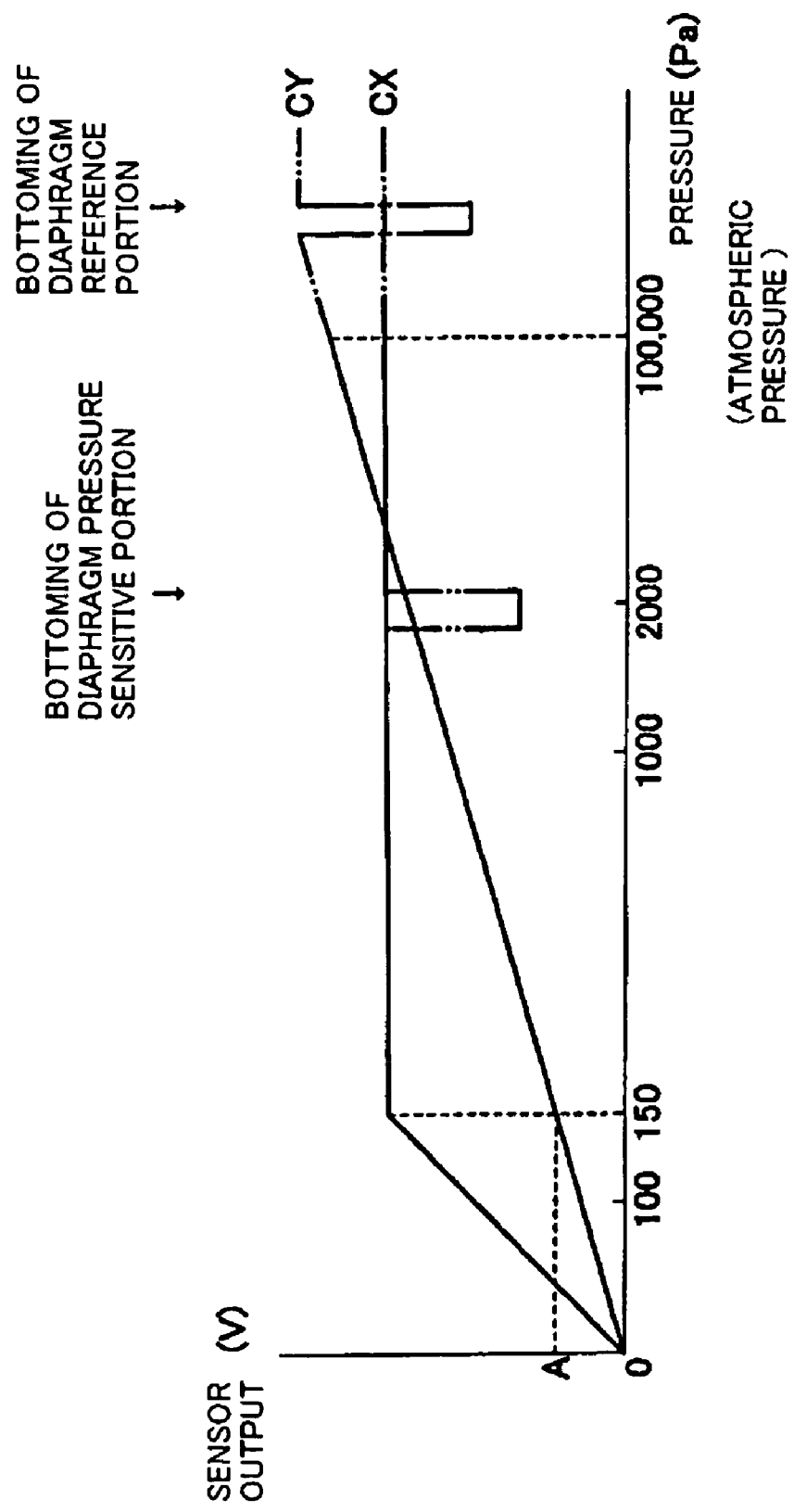
FIG. 5 is a view showing a relationship between a pressure applied to the sensor diaphragm and outputs from the pressure-sensitive capacitance detecting portion and the reference capacitance detecting portion in a third algorithm according to this embodiment.

FIG. 5 is view showing a sensor output obtained from the pressure-sensitive capacitance detecting portion 101 and a sensor output acquired from the reference capacitance detecting portion 102 in such a pressure sensor 1 in accordance with a magnitude of a pressure applied to the pressure sensor 1.

As indicated by a solid line in FIG. 5, although a signal output value of the pressure-sensitive capacitance detecting portion 101 increases in accordance with a pressure of the process gas acting on the pressure sensor 1 in a range where the pressure is 0 Pa to 150 Pa, the signal output value of the pressure-sensitive capacitance detecting portion is output as an external output value while being fixed to the upper limit value in case of a higher pressure more than the pressure in the range.

It is to be noted that a part of the region of the diaphragm 12 on which the pressure-sensitive capacitance detecting portion 121 is formed reaches the bottom with a pressure of approximately 2,000 Pa, but an inconvenience that a sensor output is temporarily lowered (see the chain double-dashed line in the drawing) in the vicinity of bottoming like a conventional pressure-sensitive capacitance detecting portion does not occur even in this case, and the external output value is kept being fixed to the upper limit value as indicated by the solid line, thereby avoiding generation of an erroneous external output value at the time of bottoming of the diaphragm.

On the other hand, a signal output value of the reference capacitance detecting portion 102 increases in accordance with a pressure of the process gas acting on the pressure sensor 1 until the pressure exceeds 100,000 Pa which is atmospheric pressure, and this signal output value is output as an external output value without change. It is to be noted that a part of the region of the diaphragm 12 on which the reference capacitance detecting portion 102 reaches the bottom in a range where the pressure exceeds an atmospheric pressure which is out of the regular use range of the pressure sensor 1.

As a result, measurement is possible in a wider pressure range, and one sensor can virtually function as two sensors, thus realizing a reduction in a size of the pressure sensor.

It is to be noted that using a microprocessor or the like to effect temperature correction or linearity correction can suffice in order to increase a measurement accuracy of the reference capacitance CY in the above-described embodiment.

On the other hand, it is also possible to adopt a mode which uses a microprocessor or the like to automatically switch a regular measurement value to an external output value obtained by measurement in the reference capacitance detecting portion 102 when a measurement value of the reference capacitance detecting portion exceeds the point A as the fourth algorithm.

Specific contents of the fourth algorithm (the algorithm involved an abnormal prevention by bottoming of the diaphragm at the pressure-sensitive capacitance detecting portion+reference capacitance detecting portion output automatic switching) are as follows.

First, a reference capacitance CY is measured, and a correction arithmetic operation is carried out as required. Here, if a signal output value of this capacitance is not greater than A, the above-described detection circuit is used to measure (CX−CY)/CX=Δd/d, and a correction arithmetic operation is performed as required to output an obtained result as an external output value. That is, this Δd/d is determined as a measurement value of a small pressure.

Further, if the signal output value of the reference capacitance CY is not smaller than A, the signal output value alone of the reference capacitance CY is output as an external output value of the pressure sensor 1.

Figure 6:
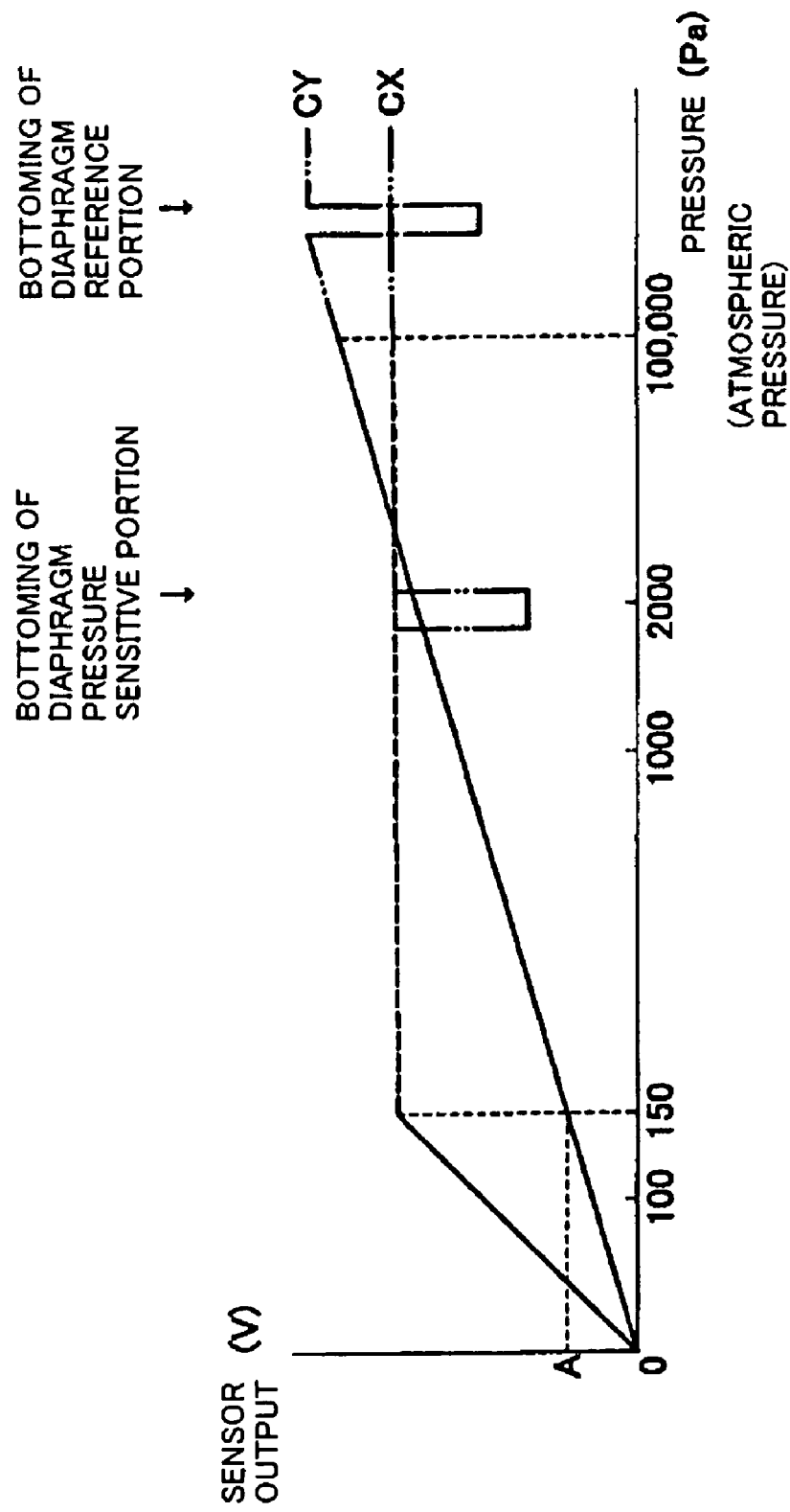
FIG. 6 is a view showing respectively a relationship between a pressure applied to the sensor diaphragm and outputs from the pressure-sensitive capacitance detecting portion and the reference capacitance detecting portion in a fourth algorithm according to this embodiment.

FIG. 6 is a view showing a sensor output obtained from the pressure-sensitive capacitance detecting portion 101 and a sensor output acquired from the reference capacitance detecting portion 102 in such a pressure sensor 1 in accordance with a magnitude of a pressure applied to the pressure sensor 1.

As indicated by a solid line in FIG. 6, although a signal output value of the pressure-sensitive capacitance detecting portion 101 increases in accordance with a pressure of the process gas acting on the pressure sensor 1 in a range where the pressure is 0 Pa to 150 Pa, the signal output value of the pressure-sensitive capacitance detecting portion 101 is kept being fixed to an upper limit value in case of a higher pressure more than the pressure in the range, and this signal output value is not output as an external output value as indicated by a dotted line in the drawing.

On the other hand, a signal output value of the reference capacitance detecting portion 102 increases in accordance with a pressure of the process gas acting on the pressure sensor 1 until the pressure exceeds an atmospheric pressure 100,000 Pa, and a signal output value V3 of the reference capacitance detecting portion 102 is output as an external output value without change in a range exceeding 0 Pa to 150 Pa which is out of a regular use range of the pressure senor 1 in place of not outputting an external output value from the pressure-sensitive capacitance detecting portion 101.

As a result, measurement can be accurately performed in a range of a small pressure, and measurement is also enabled in a wide pressure range. Furthermore, a unique external output value can be obtained by determining a signal output value A of the reference capacitance detecting portion 102 as a threshold value and automatically switching an external output value, and hence a user no longer wavers in selection of an external output value.

It is to be noted that a circuit configuration of the detection circuit described in the foregoing embodiment is not restricted, and the above-mentioned first to fourth algorithms can be realized even if a circuit configuration in the following modification is adopted.

A modification concerning the detection circuit according to the foregoing embodiment will now be described. A detection circuit concerning this modification has a circuit configuration shown in FIG. 7. It is to be noted that names of respective constituent elements in this detection circuit are the same as those in the above-described detection circuit, thereby omitting an explanation thereof.

Figure 7:
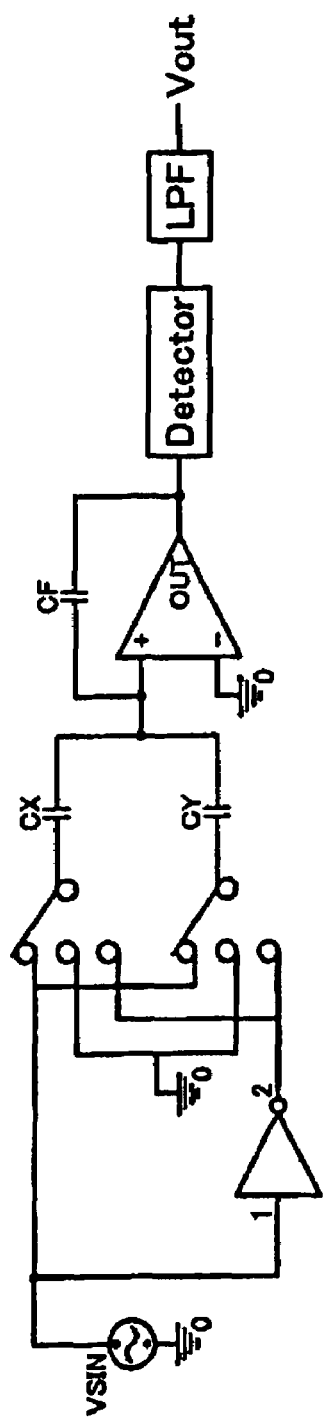
FIG. 7 is a view showing a modification of the detection circuit of the capacitance type pressure sensor according to this embodiment.

As an operation method shown in FIG. 7, the following input signals are input to a pressure-sensitive capacitance detecting portion and a reference capacitance detecting portion in a time-sharing manner to execute measurement, thereby obtaining each measurement value with respect to each input signal.

TABLE 1

| | Input signal to CX | Input signal to CY | Vout output |
|---|---|---|---|
| V1 | +Sin Wave | −Sin Wave | Output proportional to (CX − CY) |
| V2 | +Sin Wave | GND | Output proportional to CX |
| V3 | −Sin Wave | +Sin Wave | Output proportional to −(CX − CY) |
| V4 | −Sin Wave | GND | Output proportional to −CX |

Moreover, the following ratio of a signal output value V1 of the pressure-sensitive capacitance detecting portion and a signal output value V2 of the reference capacitance detecting portion, i.e., Δd/d which is accurately representing a pressure in a small pressure is output as an external output value.

$$\frac{V1}{V2} = \frac{CX - CY}{CX}$$ [Numerical Expression 5]

Alternatively, in order to further eliminate an error factor of the circuit, it is also good enough to perform measurement to obtain an accurate measurement value in the following manner.

$$\frac{V1 - V3}{V2 - V4} = \frac{CX - CY}{CX}$$ [Numerical Expression 6]

When the signal output values V1 to V4 obtained in the detection circuit according to this modification are subjected to the above-described arithmetic operation in this manner, the external output value Δd/d can be obtained as represented by Expression 1 (Numerical Expression 1), thus enabling accurate measurement of a pressure.

Additionally, the following signal is added to the signals measured in the time-sharing manner in order to carry out the first to fourth algorithms, and measurement of the single reference capacitance CY is performed. As a result, a signal output value V7 of this single reference capacitance CY can be utilized as an external output value in the first to fourth algorithms.

TABLE 2

| | Input signal to CX | Input signal to CY | Vout output |
|---|---|---|---|
| V7 | GND | Sin Wave | Output proportional to CY |

A pressure can be likewise measured based on the first to fourth algorithms even if such a modification of the detection circuit is adopted.

As described above, in the conventional measurement mode, when the diaphragm reaches the bottom due to application of an excessive pressure, destruction of the sensor can be avoided but, of course, measurement cannot be performed.

Further, a capacitance value becomes an abnormal value due to a factor of a mechanical operation at the time of bottoming depending on how the diaphragm is deformed, and there is a possibility of outputting an erroneous signal indicating no application of a pressure even though the pressure is applied.

That is, a value measured in terms of capacitances of the electrodes facing each other with a gap therebetween suddenly becomes a resistance value when the region of the diaphragm where the pressure-sensitive reference detection portion is formed reaches the bottom, but an inappropriate output signal which is not clearly indicative of a resistance value or a capacitance value is generated at the moment that the diaphragm reaches the bottom. As a result, there is a risk that an actual pressure is erroneously determined as a low pressure. As a countermeasure, an ingenuity must be exercised to prevent an erroneous signal from being generated in the structure of the sensor, but this results in an increase in a cost.

However, managing an output of the pressure sensor based on the first to fourth algorithms by using the detection circuit like this embodiment or the modification thereof can cancel an erroneous signal caused due to bottoming of the region of the diaphragm where the pressure-sensitive capacitance detecting portion is formed.

That is, this embodiment utilizes the structure that the reference capacitance detecting portion forming region of the diaphragm arranged in the periphery does not reach the bottom even though the pressure-sensitive capacitance detecting portion forming region of the diaphragm reaches the bottom and that the reference capacitance detecting portion has sensitivity in a wide pressure range although its displacement is smaller than that of the pressure-sensitive capacitance detecting portion, and characterized in that measurement of the single reference capacitance CY is simultaneously carried out in addition to the conventional measurement.

As a result, although an error becomes slightly large, one pressure sensor can provide a wider measurement range (a pressure range which is, e.g., 100-fold of a regular measurement range) than a regular measurement range, and hence individual pressure sensors do not have to be provided like the prior art.

Furthermore, it is possible to provide the reliable pressure sensor which does not output an erroneous signal even if there is an abnormal movement at the time of bottoming.

It is to be noted that the above has described as to the pressure sensor formed of sapphire in the foregoing embodiment, but the present invention is not restricted thereto, and it can be also applied to, e.g., a pressure sensor consisting of quartz, a pressure sensor consisting of ceramics or a pressure sensor consisting of silicon.

Additionally, an external output value of the pressure-sensitive capacitance detecting portion 101 is fixed to an upper limit value when a signal output value of the reference capacitance detecting portion 102 becomes A or above in the foregoing embodiment, but it is needless to say that the scope of the present invention includes a structure in which a signal output value of the pressure-sensitive capacitance detecting portion is fixed to a lower limit value when a signal output value of the reference capacitance detecting portion becomes A or above in a case where the signal output value of the pressure-sensitive capacitance detecting portion is reduced with an increase in a pressure.

INDUSTRIAL APPLICABILITY

As the embodiment of the capacitance type pressure sensor according to the present invention, the description has been given as to the capacitance type pressure sensor which is attached to the vacuum chamber of the semiconductor process, but an attachment target of this capacitance type pressure sensor is not restricted to such a vacuum chamber, and it can be extensively applied to applications in, e.g., a case where a pressure close to an atmospheric pressure is accurately measured like a vulcanizer installed in a tire manufacturing process or the like and a high pressure in an apparatus during an operation of the apparatus is roughly measured in a wide pressure range, or a case where a pressure which is close to an atmospheric pressure must be accurately measured at the time of taking in or out a food like food processing plants and a high pressure being provided between plants during food processing must be roughly measured.

The invention claimed is:

1. A capacitance type pressure sensor comprising capacitance detecting portions formed in opposed regions in a capacitance chamber which is at least partially formed of a diaphragm, the capacitance detecting portions being a pressure-sensitive capacitance detecting portion which is formed in region of the diaphragm having large sensitivity with respect to a pressure and a reference capacitance detecting portion which is formed in a region of the diaphragm having small sensitivity with respect to a pressure, wherein the pressure sensor is structured such that a signal output value of the reference capacitance detecting portion is detected independently of a signal for correction calculation and outputted as a pressure signal even in a region exceeding a measurement range of the regular pressure-sensitive capacitance detecting portion.

2. The capacitance type pressure sensor according to claim 1, wherein the pressure sensor is structured such that an external output value corresponding to a pressure is output based on a signal output value of the pressure-sensitive capacitance detecting portion and a signal output value of the reference capacitance detecting portion when the signal output value of the reference capacitance detecting portion falls within a fixed range, and the signal output value of the pressure-sensitive capacitance detecting portion is fixed to a predetermined signal output value in a region where the signal output value of the reference capacitance detecting portion exceeds a measurement range of the regular pressure-sensitive capacitance detecting portion.

3. The capacitance type pressure sensor according to claim 2, wherein an alarm is given when the signal output value of the reference capacitance detecting portion exceeds the fixed range.

4. The capacitance type pressure sensor according to claim 2, wherein the pressure sensor is structured such that an external output value corresponding to a pressure is output as a pressure signal based on a signal output value of the pressure-sensitive capacitance detecting portion and a signal output value of the reference capacitance detecting portion when the signal output value of the reference capacitance detecting portion falls within a fixed range, and the signal output value of the reference capacitance detecting portion is output as a pressure signal upon determination that a measurement range of the regular pressure-sensitive capacitance detecting portion is exceeded when the signal output value of the reference capacitance detecting portion exceeds the fixed range.

* * * * *